March 24, 1970 — A. C. CROSBIE — 3,502,047
VENT CHECK VALVE
Filed Feb. 29, 1968
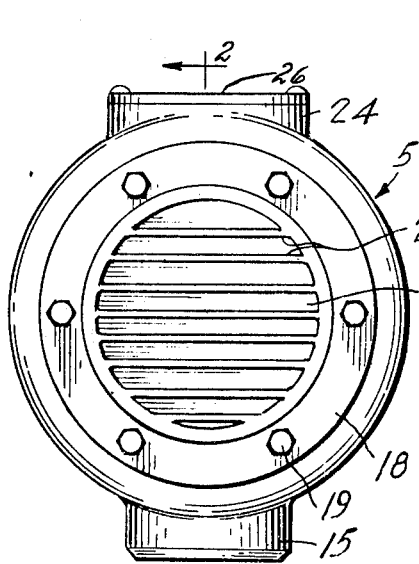
FIG. 1
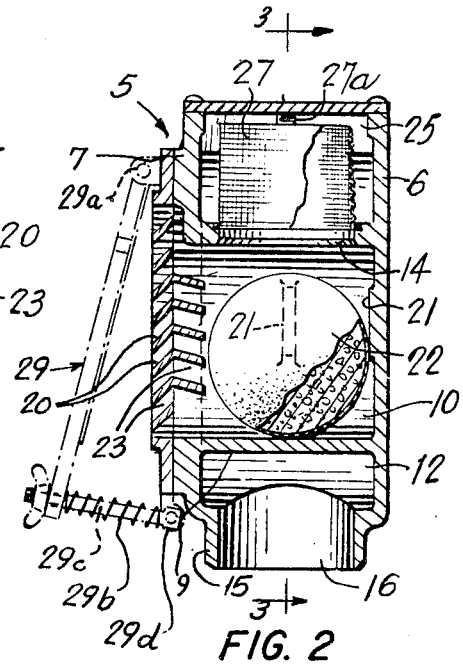
FIG. 2
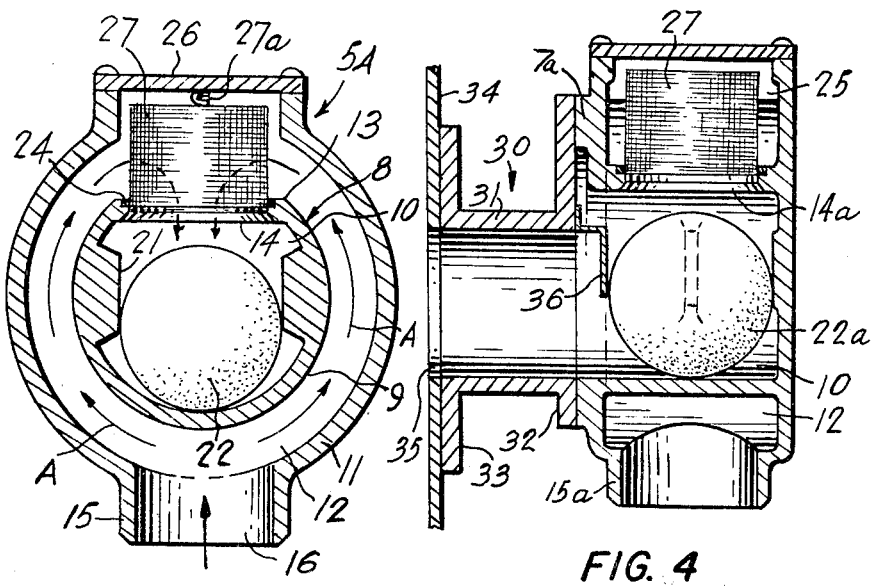
FIG. 3
FIG. 4
INVENTOR
A. C. CROSBIE
Fetherstonhaugh & Co.
ATTORNEYS United States Patent Office 3,502,047
Patented Mar. 24, 1970

3,502,047
VENT CHECK VALVE
Alfred C. Crosbie, St. Laurent, Quebec, Canada, assignor to A. Crosbie & Sons Limited, Montreal, Quebec, Canada
Filed Feb. 29, 1968, Ser. No. 709,331
Claims priority, application Canada, Dec. 6, 1967, 8,611
Int. Cl. B63j 2/08
U.S. Cl. 114—212          6 Claims

ABSTRACT OF THE DISCLOSURE

A vent check valve for installation on tanks where the valve is at times immersed in water comprising a casing having a valve compartment having a valve seat in communication with a surrounding vent channel connected to the tank to be vented, a floatable ball valve in the valve compartment raised into seating engagement with the valve seat when the valve casing is immersed in water, a flame barrier on the side of the valve seat facing the vent channel, louvres in said valve compartment to divert water from the compartment, and cover means to close off the valve compartment.

---

This invention relates to vent check valves and particularly to such valves as are installed on tanks where the vent location is, at times immersed in water.

In venting oil tanks such as the oil tanks in ships, the vent pipes are brought up through the deck of the ship or through the side walls of the tank. Oil tank vessels normally ride low in the water and therefore the deck of the vessel is often times under water. In order to prevent flooding of the vent pipes the top end of the vent pipe has been given a 180° bend This has not been satisfactory as it has not prevented at least some water from entering the pipe and subsequently entering the oil tank. It has also been the practice to fit a check valve in free end of the 180° bend of the vent pipe. While such check valves provide a better degree of protection than the open reverse bend pipe they have been found unsatisfactory in that there is considerable obstruction by the valve to free escape of the oil fumes and so contribute to a pressure or vacuum build-up in the oil tank.

The present invention consists essentially of a check valve which can be installed upright on the top end of a vent pipe or be installed directly on the side wall of the oil tank. The valve consists of an outer casing and an inner ball valve chamber with an internal passage between the outer casing and inner valve chamber whereby the fumes, rising up the vent pipe, are carried through the internal passage to above the inner valve chamber and thence downwards through a ball valve seat in the top of the inner chamber and thence out through an opening in the side of the outer casing. The ball of the valve is floated when water enters the inner valve chamber and moves upwards and is seated on the valve seat at the top of the valve chamber thereby preventing passage of water upwards and into the internal passage and to the vent pipe. The outlet from the valve chamber is preferably protected by a grill or louvre to prevent the entry of solids and a solid cover may be supplied to close the outlet completely when desired. Under ordinary operating conditions this cover is maintained in an open position by means of a toggle bolt and spring assembly and provides further protection against the ingress of water to the valve. A flame barrier is provided within the internal passage at the valve seat to prevent tank gases or fluid from being ignited from a flame at deck level.

The object of the invention is to provide a vent check valve which will prevent the entry of water into the vent pipe or the ignition of gases or fluid in the tank to which the vent pipe is attached.

A further object of the invention is to provide a vent check valve which can be installed directly on the top end of a vent pipe or on the side wall of a tank.

A further object of the invention is to provide a ball check valve which remains open during venting and is floatable into a closed position when flooding from outside occurs.

A further object of the invention is to provide a ball check valve in which is incorporated a flame guard.

These and other objects of the invention will be apparent from the following detailed specification and the accompanying drawings in which:

FIG. 1 is a front vertical elevation of the vent check valve according to the present invention.

FIG. 2 is a vertical section taken on the line 2—2 of FIG. 1 showing the ball valve in its normally open position.

FIG. 3 is a vertical section taken on the line 3—3 of FIG. 2.

FIG. 4 is a view similar to FIG. 2 but showing a flange attachment for mounting the valve on the inside wall of a tank.

Referring to the drawings, the vent check valve consists of a cylindrical casing 5 having one end wall 6 closing the rear of the casing and a second end wall 7 forming the front of the casing.

A cylindrical check valve housing 8 is cast integral with the ends walls 6 and 7 and coaxial with the axis of the cylindrical casing 5. The wall 9 of the housing 8 enclose the valve chamber 10 and form with the wall 11 of the casing 5 annular passage 12.

The wall 9 of the housing 8 has its topmost portion made horizontal at 13 and a ball valve seat 14 is machined on its inner face within the chamber 10. The valve seat 14 is machined on the vertical centreline passing through the axis of casing 5 and valve chamber 10.

A boss 15 on the outer surface of the wall 11 of the casing 5 is drilled to fit on the top open end of a vent pipe (not shown) to make direct connection between the vent pipe and the annular passage 12. The boss 15 is located on the vertical centreline passing through the axis of the cylindrical casing 5 and check valve housing 8. The boss 15 may have a smooth bore 16 for a welded connection with the vent pipe or it may be threaded for a threaded connection with the vent pipe.

The front wall 7 of the casing 5 has an opening 17 communicating with the interior of the valve chamber 10.

A face plate 18 secured to the outer face of the front wall 7 by the cap screw 19 is provided with a series of dog-leg shaped louvres 20, some of which project into the opening 17 of the valve chamber 10. The inner ends of the louvres 20 together with the guide surfaces 21 projecting inwardly from the inner surfaces of the wall 9 maintain the ball valve 22 central with the axis passing through the valve seat 14. The dog-leg shape of the louvres 20 have the effect of diverting any water entering the valve chamber downwards away from the valve seat.

The ball valve 22 is made of a light weight durable material which will float on water which may enter the valve chamber 10 through the openings 23 between the louvres 20.

The upper portion of the casing 5 is provided with an extension portion 24 forming a chamber 25 which is in permanent open communication with the internal passage 12. This chamber 25 is closed off by the removable cover plate 26.

A circular wire mesh flame barrier 27 closed at one end is located within the chamber 25. The open end of the barrier 27 is seated in the circular recess 28 about the outer periphery of the valve seat 14. The flame barrier 27 is held down in the recess 28 by a spring clip 27a on the under side of the cover 26.

A closure plate or door 29 may be hingedly mounted on the face plate 18 for closing off the louvred openings 23 when venting is not required. The door 29 is pivoted at 29a at the top of the louvred plate 18 and is normally held in an open position by the spring 29b and toggle bolt 29c, the toggle bolt 29c being pivotally mounted at 29d at the bottom of the louvred plate 18, as shown in FIG. 2. The door 29 provides additional protection in the open position against ingress of water to the valve while permitting ample area for the exhaust of gases from the vent.

The above described device is suitable for mounting directly on a vent pipe. However, the device can be mounted on the inner wall of a tank such as the hull plates of ships tanks at the highest point possible. Such a modification is shown in FIG. 4.

In this modification the casing 5A is similar to the casing 5 described above except that the boss 15a is not connected to a vent pipe but is open to the tank which is being vented. The face plate 18 of the casing 5 is replaced by a flanged member 30 comprising a tubular portion 31, a flange 32 on one end of the tubular portion and a flange 33 on the opposite end of the tubular portion. The flange 32 is secured to the end wall 7a of the casing 5A and the flange 33 is connected to the inside wall 34 of a tank about an opening 35.

A guide member 36 secured on the inner face of the flange 32 replaces the louvres 20, above described, in holding the ball valve 22a axially aligned with the valve seat 14a.

In the operation of this device whether directly connected to a vent pipe or mounted on the inner wall of a tank, the fumes to be vented enter the device through the boss 15 and pass upwards through the internal passage 12 in the direction of the arrows A (FIG. 3), thence through the wire mesh flame barrier 27, down through the valve seat into the valve chamber 10 and out through the louvres 20, in the case of FIG. 2, or through the opening 35 in the case of FIG. 4, to the atmosphere. Should the deck of the vessel over which the device of FIG. 2 be located, or the opening 35 be awash at intervals, water will enter the valve chamber 10 and the valve 22 will float upwards into seating engagement with the valve seat 14, thereby preventing water from entering the internal passage 12 and flooding the tank.

In the same manner, should there be a deck fire, or the vessel be enveloped in flames, while the ball valve will not float upwards, the flame entering into the valve chamber will be prevented from entering the internal passage 12 and so prevent ignition of the contents of the tank.

As the mesh of the flame barrier 27 is of necessity of fine mesh, it will require to be cleaned at intervals. This is readily accomplished by removing the cover plate 26, flame barrier can then be removed to be cleaned or replaced without disturbing the mounting of the device on the vent pipe. Similarly, should the ball valve 22 require servicing, such as cleaning or replacing, the face plate 18 can be removed giving ready access to the interior of the valve chamber.

The above described device provides safe and positive venting of harmful fumes from a tank while insuring against flooding of the tank either from rain or sea water while, at the same time providing a degree of safety against fire hitherto not available. The louvred grid or the casing diverts water downwards away from the valve seat and therefore provides protection against damage to the flame barrier.

The circular shape of the outer casing and the inner valve chamber ensures that the annular passage between them will have a cross section area in excess of the area of the vent pipe to which the device is connected while keeping the overall size of the device down to a minimum. The shape of the device also ensures that it can be installed close to a bulkhead or coaming with a minimum of obstruction to deck space etc.

What I claim is:

1. A vent check valve for venting gas fumes from a confined space and preventing flooding of such confined space comprising a casing, a valve chamber within said casing, said valve chamber being open to the atmosphere, a floatable valve in said valve chamber, a valve seat in the upper portion of said valve chamber against which the said valve is floated into sealing contact a louvred cover covering the opening to atmosphere in said valve chamber the louvres of the said cover adapted to maintain the said valve to vertical movement on an axis passing through said valve seat, and a passage in said casing communicating at one end with the confined space to be vented and at the other end with said valve chamber through said valve seat.

2. A vent check valve as set forth in claim 1 in which the said interior passage has an enlarged portion adjacent the valve seat of the valve chamber, and a flame guard is fitted within the said enlarged portion of the interior passage and around the opening of the said valve seat.

3. A vent check valve as set forth in claim 2 in which the said casing has a removable cover providing access to the said flame guard.

4. A vent check valve as set forth in claim 1 at least some of the louvres are dog-leg in cross section, the outward portion of the dog-leg louvres being angled downwards to limit the flow of water and foreign matter into the said valve chamber and the inner edge portion of the dog-leg louvres forming guides for the floatable valve.

5. A vent check valve as set forth in claim 1 in which the said casing is provided with a threaded boss in the lower portion thereof, for connection with a vent pipe.

6. A vent check valve as set forth in claim 1 in which the opening to atmosphere includes a cover plate pivotally mounted adjacent the top of the said louvred cover, and spring means normally holds the said cover in an open position to permit free venting past the louvred cover.

References Cited

UNITED STATES PATENTS

| 938,593 | 11/1909 | Laubeuf | 114—178 |
| 1,028,160 | 6/1912 | Van Herdman | 114—178 |
| 1,851,084 | 3/1932 | Brown et al. | 114—212 |
| 2,395,619 | 2/1946 | Fischer et al. | 114—211 |

FOREIGN PATENTS

| 845,625 | 8/1960 | Great Britain. |

MILTON BUCHLER, Primary Examiner

J. E. PITTENGER, Assistant Examiner

U.S. Cl. X.R.

137—519.5; 220—88